United States Patent [19]
Deppe

[11] Patent Number: 5,557,884
[45] Date of Patent: Sep. 24, 1996

[54] SPRAYING AND LEVEL CONTROL FOR AERO-HYDROPONIC SYSTEM

[76] Inventor: Gregory Deppe, 284 Morgan Ave., Old Bridge, N.J. 08857

[21] Appl. No.: 281,295

[22] Filed: Jul. 27, 1994

[51] Int. Cl.⁶ ................................................ A01G 31/00
[52] U.S. Cl. ............................................................. 47/62
[58] Field of Search ............................. 47/62, 62 C, 59

[56] References Cited

U.S. PATENT DOCUMENTS

| | | | |
|---|---|---|---|
| 3,300,895 | 1/1967 | Dosedla et al. | 47/62 |
| 4,218,847 | 8/1980 | Levoux | 47/62 |
| 5,010,686 | 4/1991 | Rivest | 47/62 |
| 5,127,366 | 7/1992 | Kim | 47/62 |
| 5,269,094 | 12/1993 | Wolverton et al. | 47/62 |
| 5,394,647 | 3/1995 | Blackford, Jr. | 47/62 |

FOREIGN PATENT DOCUMENTS

88/09116  12/1988  WIPO ................................ 47/62 A

Primary Examiner—Terry Lee Melius
Assistant Examiner—Joanne C. Downs
Attorney, Agent, or Firm—Arthur M. Peslak

[57] ABSTRACT

An improved aero-hydroponic growing system for plants is disclosed. The system provides for level control of the liquid nutrients in the plant tube as well as an innovative spray head for oxygenating and dispersing the liquid nutrients.

3 Claims, 3 Drawing Sheets

SPRAYING AND LEVEL CONTROL FOR AERO-HYDROPONIC SYSTEM

BACKGROUND OF THE INVENTION

The present invention concerns the field of aero-hydroponic growing systems for plants. In an aero-hydroponic system, the plants are not grown in soil as in traditional farming techniques, but rather are grown in a bath of oxygenated liquid nutrients.

The typical existing aero-hydroponic systems have a main reservoir containing the liquid nutrients. Apart from that reservoir will be some sort of tube in which the plants will be supported. Typically the plant are supported in the tube by small mesh cups filled with either clay, rock or gravel. These small mesh cups will have some sort of openings near the bottom to allow the liquid nutrients to flow in and out and reach the plant roots. The cups containing the plants will then be set into openings in the top of the tube. A pump will be used to move the nutrients from the main reservoir into the tube where the nutrients will be sprayed onto the bottom of the plant roots.

One of the problems with existing aero-hydroponic systems is that no effective means for level control and aeration in the plant tube is provided. In general, the existing systems just allow recirculation of the liquid nutrients back into the first reservoir with no aeration or control over the level of nutrients in contact with the plants. Without effective aeration or level control in the plant tube, these systems suffer from the problem that if the flow of the nutrients from the pump is interupted due to a power failure or clog for example, the plants will die much sooner than in a system providing for level control and aeration.

In addition, the current systems where aeration is not provided have much slower plant growth. The existing systems merely provide a film of nutrients along the bottom of a tube or trough without aeration.

SUMMARY OF THE INVENTION

It is an object of the present invention to provide an improved aero-hydroponic plant growing system. In order to provide such a system, a level control means for the plant tube is provided thus curing the problem described above in the existing systems without level control. In addition, a spray nozzle is incorporated in the plant tube in order to better oxygenate and distribute the nutrients to the plant roots. The combination of level control and oxygenation results in much more efficient delivery of oxygen and nutrients to the plant roots resulting in much faster and more vigorous plant growth.

The aero-hydroponic system of the present invention thus comprises a nutrient reserve reservoir containing a supply of liquid nutrients; a main nutrient reservoir connected to the nutrient reserve reservoir and supplied with liquid nutrients from the nutrient reserve reservoir; a pump connected to the main reservoir for removing the nutrients from the main nutrient reservoir; a plurality of plant tubes in which a plurality of plants will be supported; a piping system connected to the outlet of the pump and the interior of the plant tube; a spray head connected to the piping system for oxygenating and dispersing the liquid nutrients into the interior of the plurality of plant tubes; and means for controlling a level of liquid nutrients in the interior of the plurality of plant tubes.

DETAILED DESCRIPTION OF THE INVENTION

Figure 1:
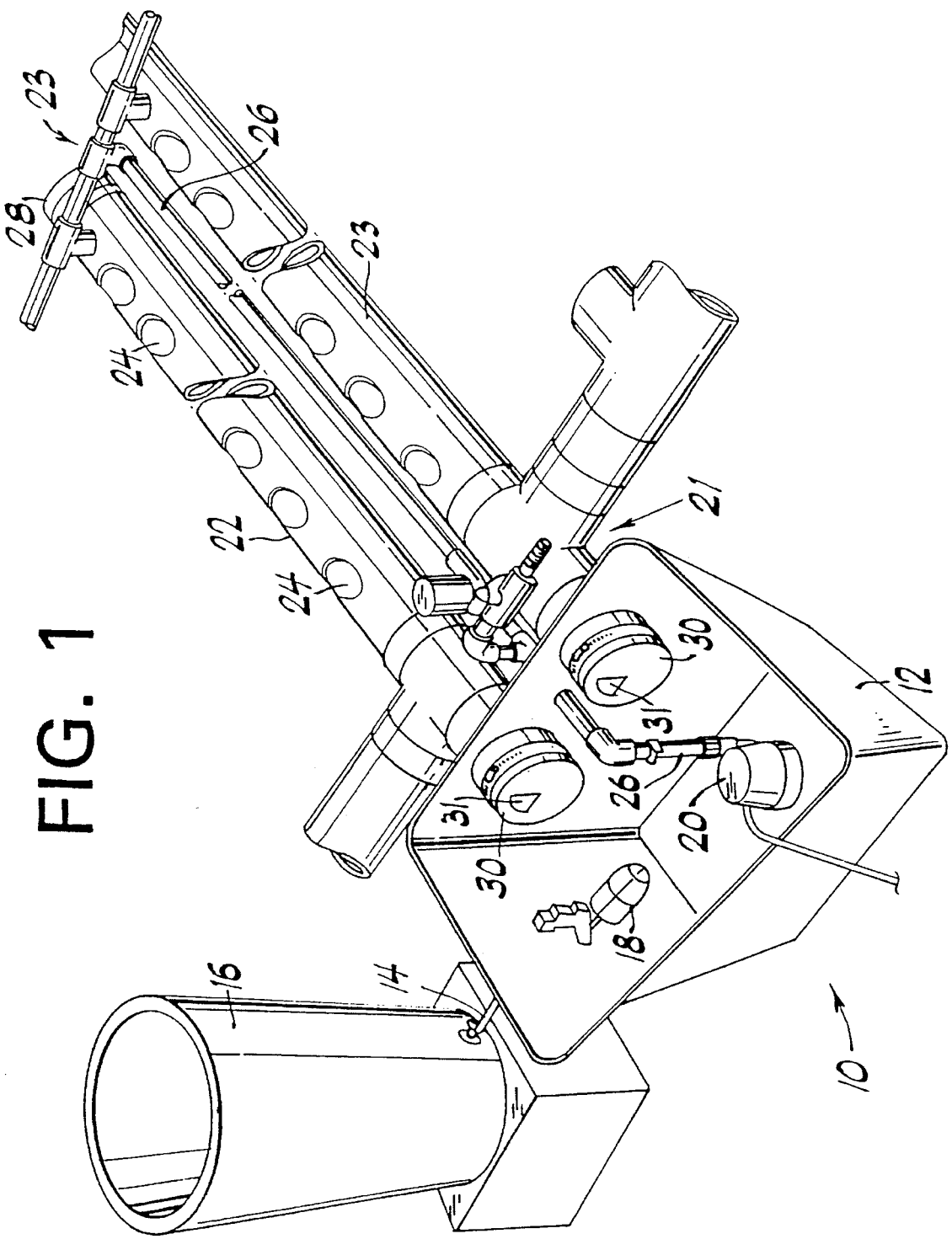
FIG. 1 is an isometric plan view of a typical aero-hydroponic growth system according to the present invention.

The aero-hydroponic system 10 of the present invention is illustrated in FIG. 1. The system 10 contains a main reservoir 12 in which a supply of liquid nutrients will be maintained. The main reservoir 12 is connected by means of a pipe or tube 14 to a nutrient reserve reservoir 16. The nutrient reserve reservoir 16 maintains a proper level of nutrients in main reservoir 12. The-proper level of nutrients in main reservoir 12 is controlled by means of a float valve 18 connected to pipe 14.

An electric centrifugal pump 20 is located on the bottom of main reservoir 12. In this embodiment of the present invention, the sump pump 20 has a capacity of 150 gallons per hour. As will be described more fully below, the sump pump 20 pumps the liquid nutrients from the main reservoir 12 into contact with the plant roots.

Near the top of main reservoir 12 there are connected a plurality of plant tubes 22. The plant tubes 22 in this embodiment are constructed from PVC sewer and drain pipe with a typical diameter of 4 inches. Cut into the top of each of the plant tubes 22 are a plurality of round holes 24. As described more fully below, the plants will be supported in the holes 24.

The sump pump 20, in this embodiment, is connected to the interior of the plurality of plant tubes 22 by means of ½ inch PVC pipe 26. As shown in FIG. 1, the pipe 26 runs from the sump pump 20 to the end 23 of the plant tubes 22 located away from the main reservoir 12.

At end 23, a plurality of rubber caps 28 are attached to the end 23 of each of the plurality of plant tubes 22. The function of the rubber caps 28 is to seal the end of plant tubes 22. The other end 21 of the plant tubes 22 is located inside the main reservoir 12. The end 21 is permanently sealed with a rubber cover 30. The rubber covers 30 have a wedge-shaped hole 31 therein. As those of ordinary skill in the art will recognize, the actual shape of the holes 31 is not material to the present invention. These rubber covers 30 are rotatably mounted to the plant tubes 22.

Figure 2:
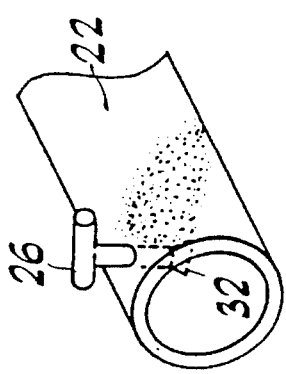
FIG. 2 is a cut away interior view of a plant tube used in the system shown in FIG. 1

FIG. 2 illustrates the interior of one of the plant tubes 22. The pipe 26 connecting the sump pump 20 to the interior of the plant tubes 22 terminates in a spray head 32. The spray head 32 atomizes the liquid nutrients and disperses them toward the plant roots in a manner that brings oxygen as well as nutrients to the plants. The spray head 32 is similar to garden or lawn spray heads used in conjunction with known garden sprinkler systems.

Figure 3:
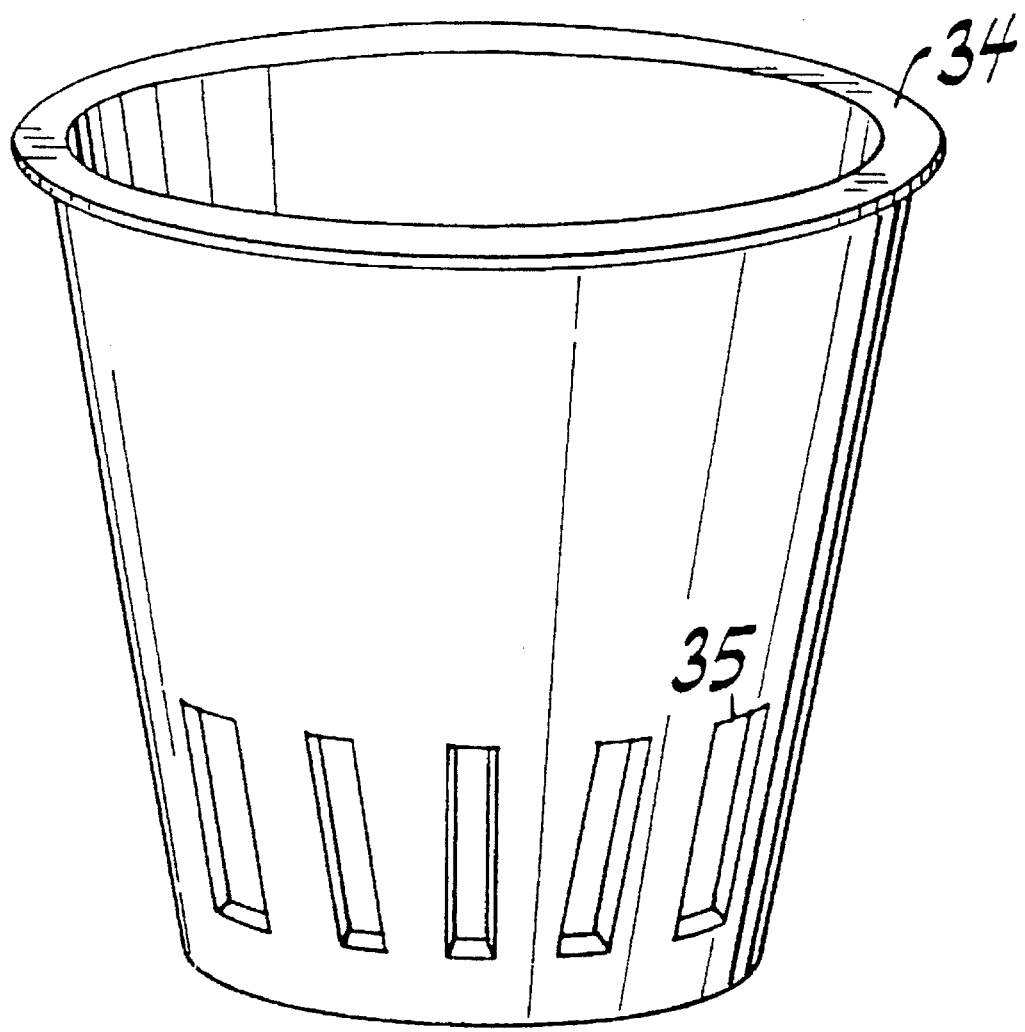
FIG. 3 is a plan view of the plant support cups used in the system shown in FIG. 1.

Typically the plants will be supported in plastic cups 34 as shown in FIG. 3. A mixture of gravel will be placed in the cup and surround the plant roots. A series of holes 35 are placed in the walls of the plastic; cups 34. The holes 35 allow the oxygen and spray of liquid nutrients to pass into the gravel mixture and into contact with the plant roots. The plastic cups 34 are then placed into the holes 24 in the plant tubes 22.

In operation, the sump pump 20 will pump the liquid nutrient mixture from reservoir 12 through connecting piping 26 and out of spray head 32. The nutrients will then pass through the interior of plant tube 22. The excess nutrients then will collect in plant tube 22. In prior systems, there is no effective means for controlling the level of the liquid nutrients in this tube. However, the present invention provides for effective level control by means of the wedge shaped hole 31 in the rubber covers 30. Thus, by rotating the rubber cover 30 and changing the position of the hole 31 with respect to the axis A of the plant tube 22, the level of the liquid nutrients accumulating in the tube 22 can be varied.

Figure 4:
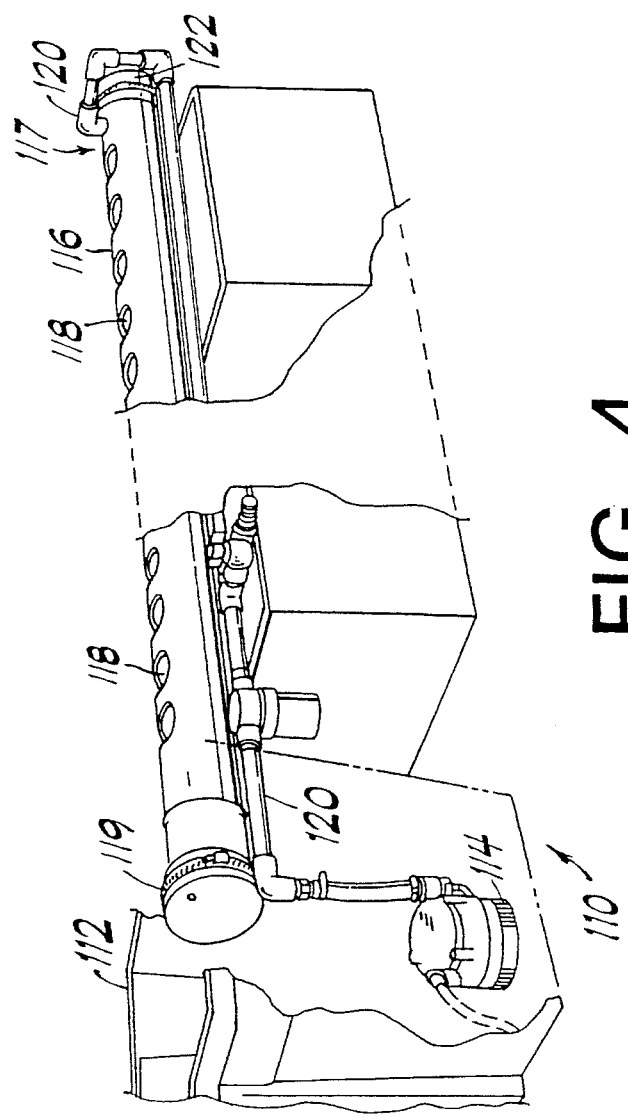
FIG. 4 is an isometric plan view of an alterative embodiment of the present invention.

FIG. 4 illustrates an alternative embodiment 110 of the aero-hydroponic system of the present invention. The system 110 contains a nutrient supply reservoir 112 that contains a supply of liquid nutrients. An electric centrifugal pump 114 is located near the bottom of reservoir 112.

Near the top of the reservoir 112 are located a plurality of plant tubes 116. The plant tubes 116 in this embodiment are constructed from PVC sewer and drain pipe with a typical diameter of 4 inches. Cut into the top of each of the plant tubes 116 are a plurality of round holes 118. As with the previously described embodiment, the plants will be supported in the holes 118.

The pump 114 is connected to the interior of the plurality of plant tubes by means of ½ inch diameter PVC pipe 120. As shown in FIG. 4, the pipe 120 runs from pump 114 to the end 117 of the plant tubes 116 located away from the reservoir 112.

At end 117, a plurality of rubber caps 122 are attached to the end 117 of each of the plurality of plant tubes 116. The function of the rubber caps 122 is to seal the end of the plant tubes 116. The other end of the plant tubes 116 are located inside the reservoir 112. A plurality of rubber caps 119 are permanently connected to the end of plant tubes 116 inside the reservoir 112.

Figure 5:
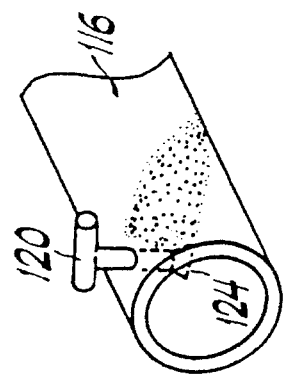
FIG. 5 is a cut away interior view of a plant tube used in the system shown in FIG. 4.

FIG. 5 illustrates the interior of one of the plant tubes 116. The pipe 120 terminates in a spray head 124 similar to the spray head 32 used in the previously described embodiment.

The plants themselves will be supported in the plastic cups 34 shown in FIG. 3.

This embodiment will operate in a manner similar to that described in the previous embodiment 10 except that no level control is provided in the plant tubes 116. However, the embodiment 110 does incorporate the previously described innovative spray head 124.

Those of ordinary skill in the art will recognize that the embodiments just described merely illustrate the principles of the present invention. Many modifications may be made thereto without departing from the spirit and scope of the invention as set forth in the following claims.

What is claimed is:

1. An aero-hydroponic plant growing system comprising;
  a) a nutrient reserve reservoir containing a supply of liquid nutrients;
  b) a main reservoir connected to the nutrient reserve reservoir and supplied with liquid nutrients from the nutrient reserve reservoir;
  c) a pump with an inlet and an outlet whereby the inlet is connected to the main reservoir for removing the liquid nutrients from the main reservoir;
  d) a plurality of plant tubes in which a plurality of plants will be supported;
  e) a piping system connected to the outlet of the pump and the interior of the plant tubes;
  f) a spray head connected to the piping system for oxygenating and dispersing the liquid nutrients into the interior of the plurality of plant tubes; and
  g) means for controlling the level of liquid nutrients in the interior of the plurality of plant tubes.

2. The aero-hydroponic plant growing system of claim 1 wherein the means for controlling the level of liquid nutrients in the interior of the plurality of plant tubes comprises a cover rotatably mounted to an end of each of the plurality of plant tubes and the cover further comprises a wedge shaped hole.

3. The aero-hydroponic plant growing system of claim 1 wherein the means for controlling the level of liquid nutrients in the interior of the plurality of plant tubes comprises a cover rotatably mounted to an end of one of the plurality of plant tubes and the cover further comprises a wedge shaped hole.

\* \* \* \* \*